United States Patent [19]
Nakagawa et al.

[11] Patent Number: 5,459,852
[45] Date of Patent: Oct. 17, 1995

[54] CACHE BYPASS SYSTEM WITH SIMULTANEOUS INITIAL TRANSFER OF TARGET DATA TO BOTH PROCESSOR AND CACHE

[75] Inventors: Hiromasa Nakagawa; Akira Yamada; Masayuki Hata, all of Itami, Japan

[73] Assignee: Mitsubishi Denki Kabushiki Kaisha, Tokyo, Japan

[21] Appl. No.: 377,300

[22] Filed: Jan. 23, 1995

Related U.S. Application Data

[63] Continuation of Ser. No. 641,217, Jan. 15, 1991, abandoned.

[30] Foreign Application Priority Data

Jan. 18, 1990 [JP] Japan ................... 2-10839

[51] Int. Cl.⁶ ............................. G06F 12/12; G06F 12/06
[52] U.S. Cl. .............. 395/465; 365/230.01; 364/DIG. 1; 395/460
[58] Field of Search .............. 364/200 MS File, 364/900 MS File, 243.41, 243.42, 238.6; 395/425; 365/230.01

[56] References Cited

U.S. PATENT DOCUMENTS

| | | | |
|---|---|---|---|
| 4,156,906 | 5/1979 | Ryan | 395/425 |
| 4,399,506 | 8/1983 | Evans et al. | 395/425 |
| 4,571,674 | 2/1986 | Hartung | 395/250 |
| 4,740,889 | 4/1988 | Motersole et al. | 395/425 |
| 4,888,679 | 12/1989 | Fossum et al. | 395/800 |
| 5,027,270 | 6/1991 | Riordan et al. | 395/425 |
| 5,134,563 | 7/1992 | Tayler et al. | 395/250 |
| 5,185,878 | 2/1993 | Baror et al. | 395/425 |
| 5,185,879 | 2/1993 | Yamada et al. | 395/425 |

*Primary Examiner*—David L. Robertson
*Assistant Examiner*—B. James Peikari
*Attorney, Agent, or Firm*—Townsend and Townsend and Crew

[57] ABSTRACT

A data processor which accesses a memory system only by a block transfer mode for transferring multiple data from the memory system when a cache misses a CPU read-access request for a single data. The data of the address designated by the CPU is read simultaneously into the CPU and cache in parallel from the memory system. After the CPU completes this read-access, the cache is then adapted to continue to read the rest of the multiple data transferred in the block transfer mode. During this time, the CPU does not newly assert an address signal, a bus control signal, and the like but continues to execute its internal processing, such as pipeline processing.

2 Claims, 6 Drawing Sheets

CACHE BYPASS SYSTEM WITH SIMULTANEOUS INITIAL TRANSFER OF TARGET DATA TO BOTH PROCESSOR AND CACHE

This is a continuation of application Ser. No. 07/641,217, filed Jan. 15, 1991, now abandoned.

BACKGROUND OF THE INVENTION

1. Field of the Invention

The present invention relates to a data processor with a cache system and data access method therefor, and more particularly, to a data processor with a cache system which provides simplified access control for a memory, high-speed processing of a CPU when the cache system misses, and a data access method.

2. Description of the Related Art

FIG. 1 is a block diagram of a peripheral portion of the CPU and cache of the invention disclosed in U.S. Pat. No. 5,185,879 which exemplifies a prior art data processor with a cache system.

This illustrated example shows a memory system 3 accessed merely by a block transfer mode which transfers multiple data from the memory system 3, when a cache 2 misses when the CPU 1 accesses to read a single data for the cache 2.

A system bus buffer 6 is the common interface between the CPU 1 and cache 2 and a system bus SB.

Signals being sent and received between the CPU 1, cache 2, and system bus buffer 6 can be roughly divided into control signals, address signals, and data signals.

A control signal SCa is used as a duplex common control signal between the CPU 1, cache 2, and system bus buffer 6. A control signal SCb which is used only where the CPU 1 is a bus master is used as both a duplex signal between the CPU 1 and cache 2 and as a duplex signal between the CPU 1 and multiplexer 7. Furthermore, a control signal CSCb which is used only where the cache 2 is the bus master is used as a duplex signal between the cache 2 and multiplexer 7.

When outputting data, in response to a multiplexer control signal SC1 outputted from the cache 2, the multiplexer 7 selects either the control signal SCb or CSCb to output as a control signal SCc to the system bus buffer 6. When inputting data, in response to the multiplexer control signal SC1, the multiplexer 7 has a function for sending the control signal SCc from the system bus buffer 6 as the control signal SCb to the CPU 1 or sending SCc to the CPU 1 as control signal SCb and to the cache 2 as control signal CSCb.

Control signal SCc from the system bus buffer 6 is inputted jointly to the CPU 1 and the cache 2, including a ready signal outputted from the memory system 3, as in the example of the cache system shown in FIG. 1. Signal SCd is a reread request signal outputted from the cache 2 to the CPU 1, and signal SCe is an operation enabling signal outputted from the cache 2 to the memory system 3.

An address signal AD1 is transmitted from the CPU 1 to both the cache 2 and the system bus buffer 6. An address signal AD2, which is used only where the CPU 1 is the bus master, is transmitted from the CPU 1 to both the cache 2 and a multiplexer 8. An address signal CAD2 which is used only where the cache 2 is the bus master is transmitted from the cache 2 to the multiplexer 8.

In response to a multiplexer control signal SC2 outputted from the cache 2, the multiplexer 8 selects either the address signal AD2 or CAD2 to output as an address signal AD3 to the system bus buffer 6.

A data signal SD is used as a duplex common signal between the CPU 1, cache 2, and system buffer 6. And φ designates a clock given to both the CPU 1 and the cache 2.

Next is a description of cases where the cache 2 hits and misses when the cache 2 is used by the CPU 1 in the data processor with a cache system of the prior art design described above. Assuming that the CPU 1 accesses to read a single data from the cache 2, the control signal SCa is then assumed to activate the cache 2.

In the CPU 1, one bus cycle consists of four timings T1 through T4 of the clock φ as shown in FIG. 2 (designated by T1234 in FIG. 2), and when the CPU 1 accesses to read the single data, this operation is completed in two bus cycles with no wait.

FIG. 2 is a timing chart illustrating the execution of a no wait operation when the cache 2 hits when the CPU 1 accesses to read the single data from the cache 2.

In FIG. 2, "CPU 1→" designates signals outputted from the CPU 1, address signal AD1 (address value "m") designates the high order 28 bits of address, and address signal AD2 (address value "n") designates the low order 2 bits of address.

Control signals SCb10 and SCb11 are both included in control signal SCb. Signal SCb10 is asserted over one bus cycle in order to inform that the CPU 1 is starting a bus access for the external device. Signal SCb11 expects defined data and starts to be asserted from a rise of the timing T4 (hereinafter referred to as T4↑) at which the control signal SCb10 is triggered.

"Cache 2→" designates signals outputted from the cache 2. When the cache 2 hits, a ready signal SCb12, being included in control signal SCb and indicating a cache hit, is asserted and the data signal SD is outputted. At that time, the cache 2 is not the bus master, and signal SC1, which controls multiplexer 7, signal SC2, which controls multiplexer 8, and control signal SCe, which requires allowance of operation for the memory system 3, are all negated.

The operation where the cache 2 hits when the CPU1 accesses to read data is described next.

The bus cycle in which signal SCb10 is asserted by the CPU 1 and outputs of the next address signals AD1 and AD2 are initiated is called state SR1 of cache 2. During state SR1 of cache 2, the cache 2 decides whether to hit. As a result of this decision, when the cache 2 hits, during the next bus cycle, called state SR2H, both the ready signal SCb12 indicating that cache 2 hits and the data signal SD are asserted and data is transferred to the CPU 1.

Described next are procedures for reading data of 4 words including a single data which is requested for read-access by the CPU 1 when the cache 2 misses.

When the cache 2 decides to miss, the 4-word data including the single data which was accessed to be read by the CPU 1 are read from the memory system 3 connected to the system bus SB by a round robin method.

FIG. 3 is a timing chart illustrating the above state. Each of the control signals in FIG. 3 is low-active.

First, in state SR1, in which a read-access is requested by the CPU 1, when the cache 2 decides to miss, the ready signal SCb12, which is the cache hit signal, is not asserted during the next bus cycle, called state SR2M, but the control signal SCe for the system bus buffer 6 is asserted and reading operation is activated for the memory system 3.

The cache 2 asserts the multiplexer control signal SC2 for the multiplexer 8, and outputs the address signal CAD2 (value "n+1" obtained by an increment of "+1" to the address value "n" which is accessed by CPU 1) which is outputted from the multiplexer 8 as the address signal AD3 to the system bus buffer 6. For the address "n+1" a ready signal SCc12, which was transferred from the memory system 3 and which is included in the control signal SCc being outputted from the system bus buffer 6, is outputted both as the control signal SCb to the CPU 1 and as the signal CSCb12 included in the control signal CSCb to the cache 2, respectively, because the signal SC1, the control signal for the multiplexer 7, is being asserted.

At that time, the cache 2 requests to reread data for the CPU 1 by asserting the reread request signal SCd. For the address signal AD1 (address value "m") and address signal AD3 (address value "n+1"), the cache 2 inputs the data signal SD transferred from the memory system 3 as data of the first word, as well as the ready signal CSCb12, and the operation to read-access the data by the CPU 1 is completed.

Then, having received the request to reread, the CPU 1 outputs the same address values ("m", "n") as the previous cycle, activating a bus cycle. After that, in the same manner as in the case where the cache 2 reads the data of the first word, the CPU 1 sequentially provides increments of "n+2", "n+3" to the address signal CAD2 by the round robin method, reading data of the second word and third word. When reading data of the fourth word, the cache 2 does not assert the reread request signal SCd and reads both the ready signal SCc12 outputted from the system bus buffer 6 and the data of the fourth word into the CPU 1 and the cache 2 at the same time.

As described above, the CPU 1 reads the single data of the address values ("m", "n"), and the cache 2 reads the data of 4 words including the data which was accessed to be read by the CPU 1.

In a data processor with a conventional cache system art, such as the system described above, where the cache 2 misses when the CPU 1 accesses to read the single data for the cache 2, the CPU 1 can read the data which was accessed to be read only after it carries out the reread operation three times.

In other words, in order to read the required data, the CPU 1 required 12 bus cycles in the example shown in FIG. 3. Moreover, during the reread operation requested by cache 2, execution of the internal processing of the CPU 1, such as pipeline processing, can not be continued, which reduces the processing capability of the CPU 1. Consequently, more time is required for internal processing by the CPU 1 because the reread request is facilitated by CPU 1, which can necessitate many more bus cycles.

In order to avoid such inconveniences, it is necessary to try to reduce the number of bus cycles by additionally providing in the CPU 1 a circuit capable of being accessed to read data during any given cycle irrespective of a reread request.

SUMMARY OF THE INVENTION

The foregoing inconveniences are overcome by the present invention. The primary object of the present invention is to provide a data processor and data access method therefor which enable the processor to read the data requested by a CPU as promptly as possible in a situation where a cache misses when the CPU reads data of a single word for the cache.

The data processor with a cache system of the present invention is provided with a CPU, a memory which stores data to be accessed by the CPU, a cache which stores a part of the data stored in the memory, and comprises detecting means for detecting the state of cache miss in which the data having been accessed by the CPU are not stored in the cache; first means (control signal SCe, address signal CAD2), which is activated when the detecting means detects that the cache misses, for sequentially reading from the memory multiple data, beginning with the data initially sought by the CPU; second means (control signal SCf) for preventing the CPU from accessing data while the first means is activated; third means (control signal SCb11), which is activated when the CPU accesses data, for reading the data to be accessed which was read from the memory by the first means into the CPU and which is inactivated after reading the data; fourth means (address signal CAD2) for making the first means read other data from the memory after the third means becomes inactivated; and fifth means (control signal SCe) for reading data read from the memory by the first means into the cache.

Also provided is the data access method of the data processor with the cache system of the present invention, where the cache misses when the CPU requests a read-access of a single data for the cache, and the memory system is adapted to be accessed only by a block transfer mode which transfers multiple data from the memory system. In accordance with this method the CPU and the cache simultaneously read data of the address designated by the CPU in parallel, and after the CPU completes the read-access, the cache continues to read the rest of the data. The CPU does not newly assert the address signal, the bus control signal, and the like. Instead, control signals enable the CPU 1 to continue execution of its internal processing, such as the pipeline processing.

With the data processor with the cache system of the present invention and according to its data access method, the data of the address assigned by the CPU is, first, simultaneously read in parallel in the CPU and the cache, and after the CPU completes the read-access, the rest of the data is read into the cache. The CPU does not newly assert the address signal, the bus control signal, and the like, but continues to execute its internal processing, such as the pipeline processing.

The above and further objects and features of the invention will more fully be apparent from the following detailed description with accompanying drawings.

DESCRIPTION OF THE PREFERRED EMBODIMENT

The preferred embodiment of the present invention is now described in detail with reference to the accompanying drawings.

Figure 1:
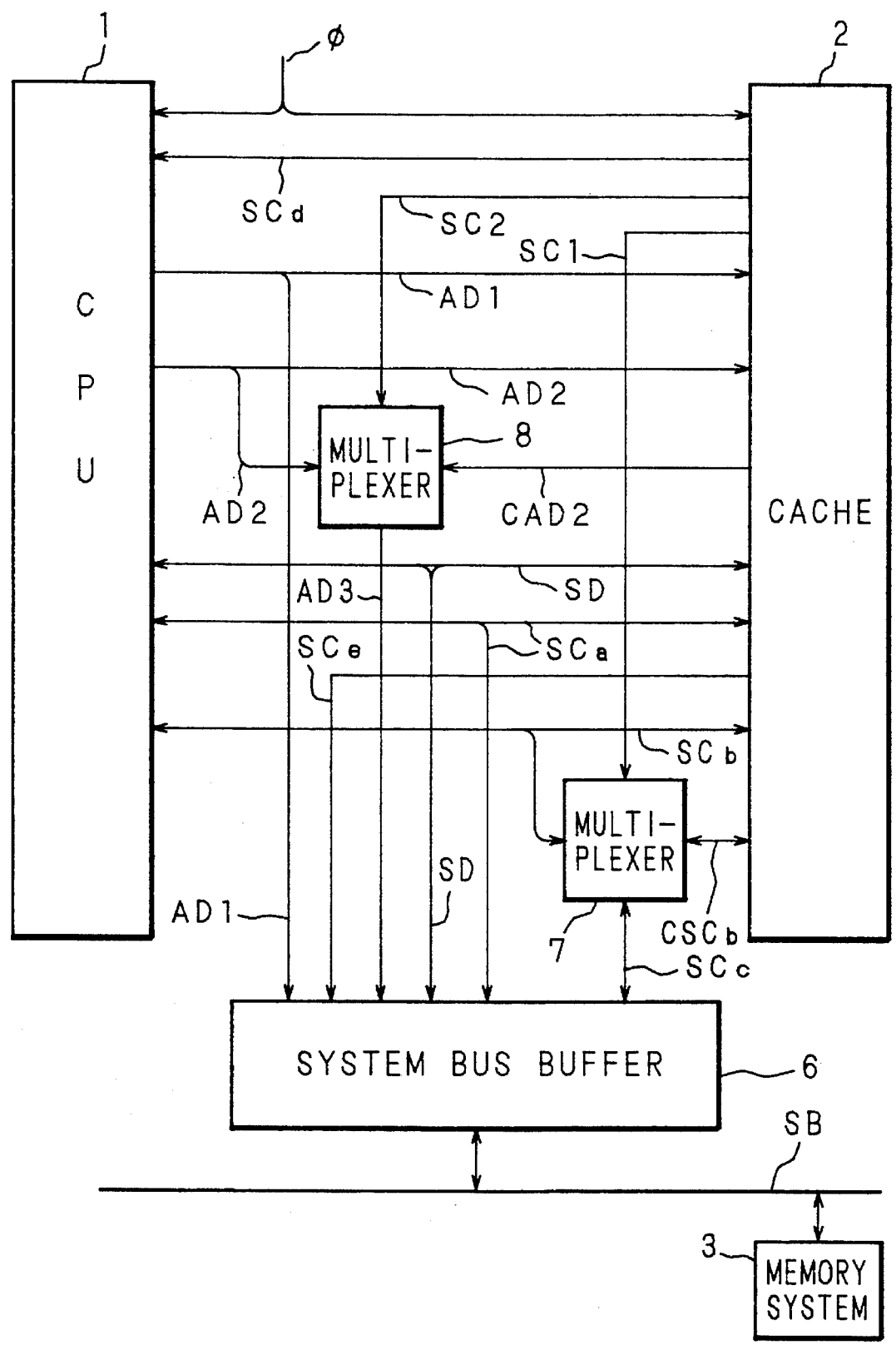
FIG. 1 is a block diagram illustrating the construction of a peripheral portion of a CPU and cache of a data processor of prior art.
Figure 2:
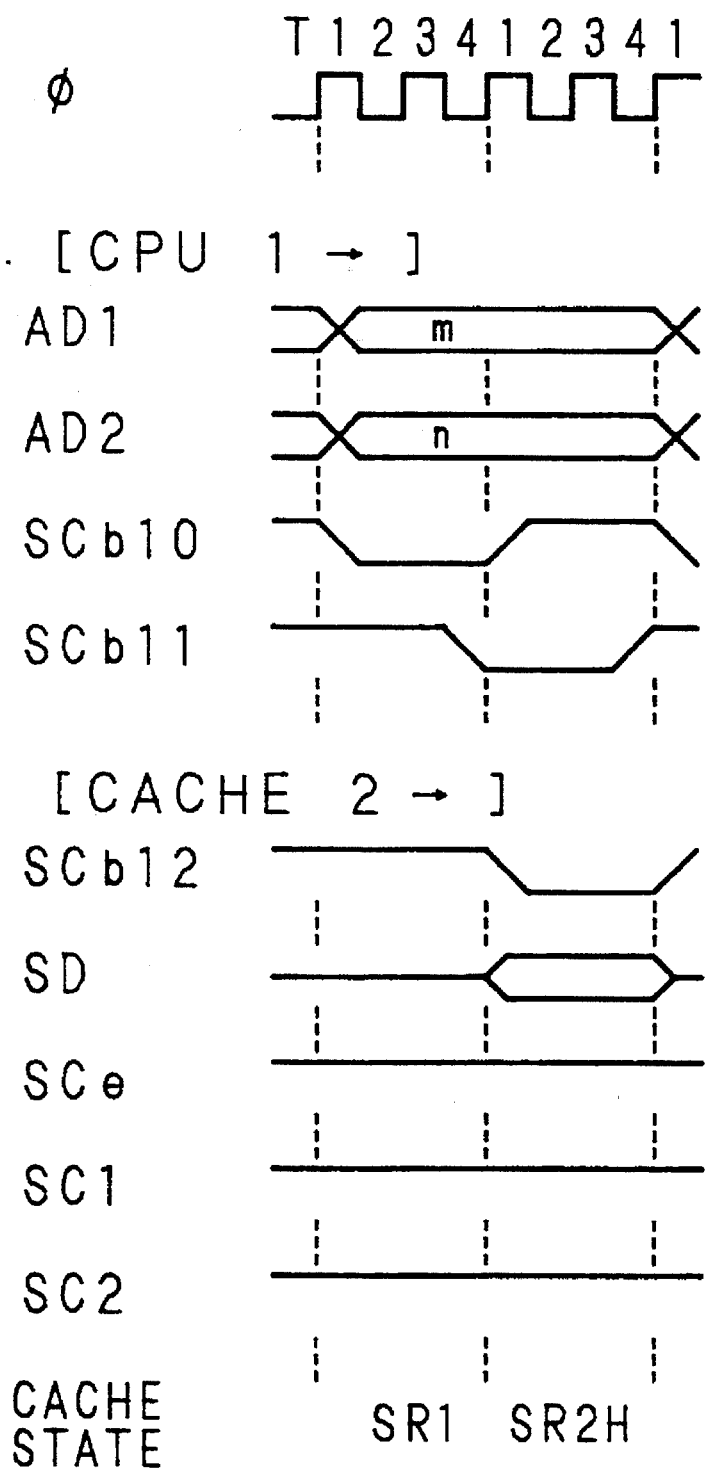
FIG. 2 is a timing chart illustrating the operation procedures of the data processor of FIG. 1 when the cache hits.
Figure 3:
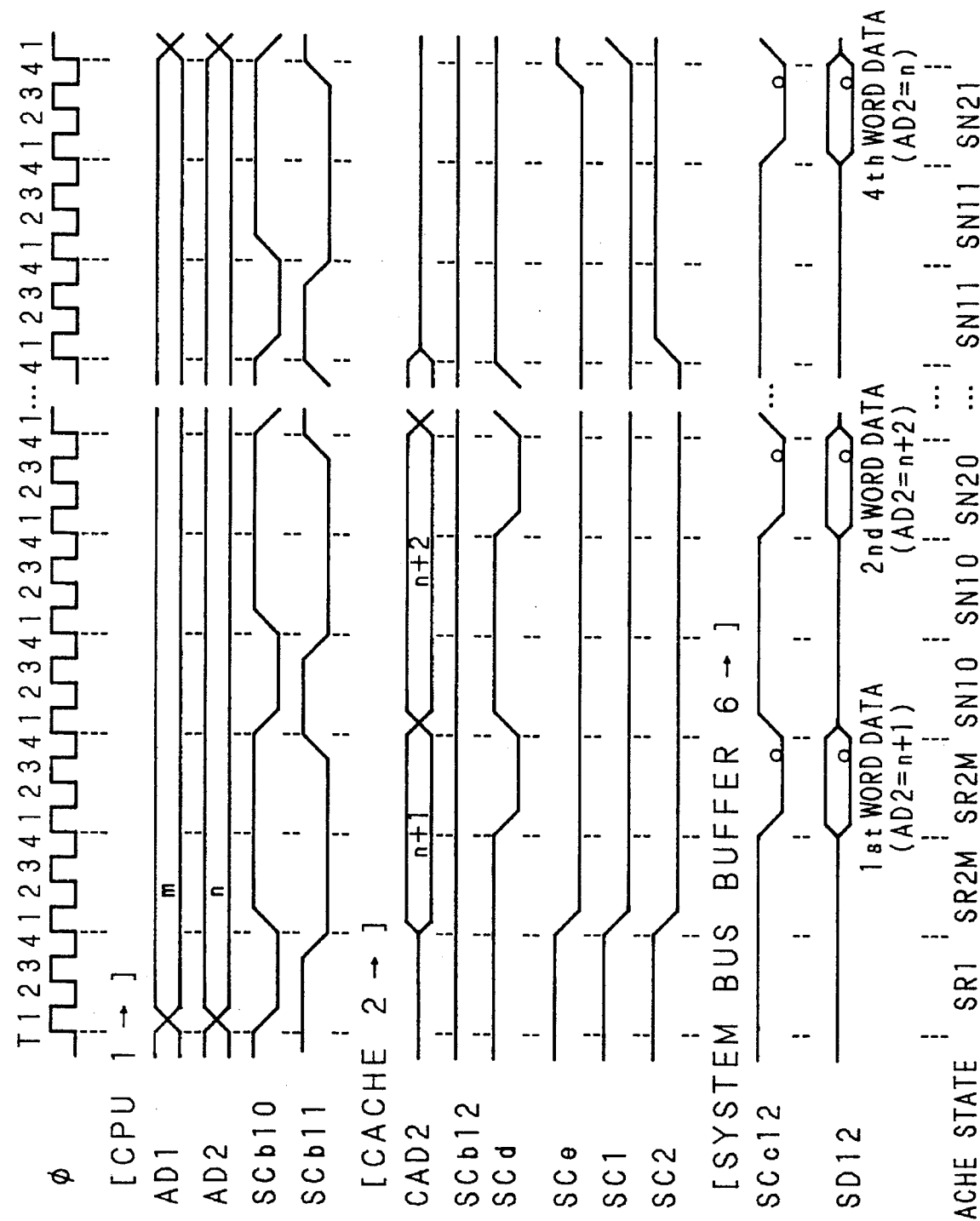
FIG. 3 is a timing chart illustrating the operation procedures of the data processor of FIG. 1 when the cache misses.
Figure 4:
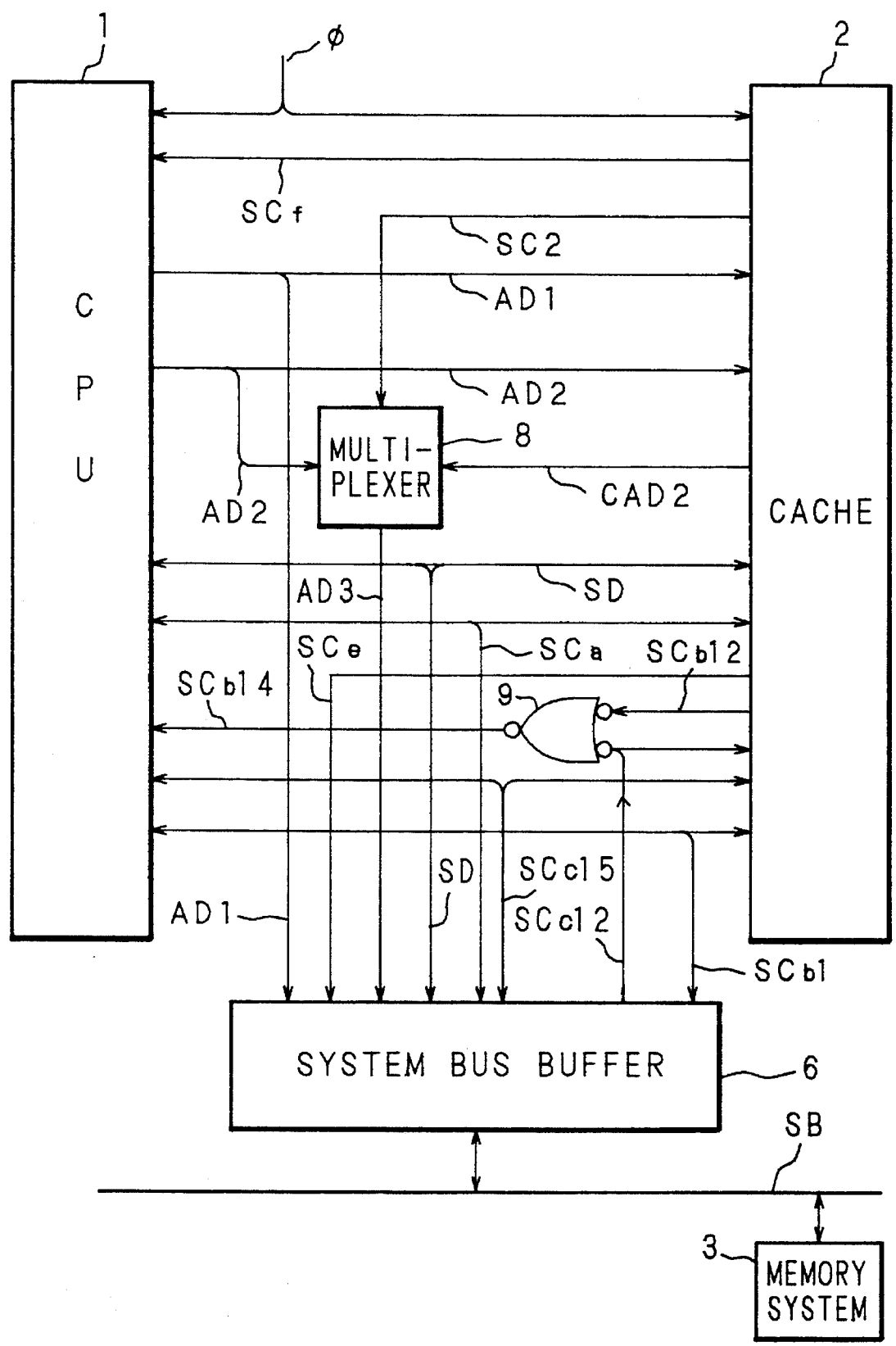
FIG. 4 is a block diagram illustrating the construction of a peripheral portion of a CPU and cache of a data processor in accordance with the principles of the present invention.

FIG. 4 is a block diagram illustrating the construction of a peripheral portion of a CPU 1 and a cache 2 of one embodiment of a data processor of the present invention. In this embodiment, when the cache 2 misses when a single data is accessed to read from the CPU 1, a memory system 3 is adapted to be accessed only by a block transfer mode which transfers multiple data from the memory system 3. Construction of the present invention shown in FIG. 4 is substantially similar to that of the prior art shown in FIG. 1, however, in the data processor of the present invention, the CPU 1 continues execution of its internal processing, such as a pipeline processing, in response to a control signal outputted from an external device, while it additionally has a function to stop execution of a new bus cycle for the external device, such as to make the CPU 1 be in an idle state.

Reference numerals in FIG. 4 designate the following elements: 1, CPU; 2, cache; 3, memory system; 6, system bus buffer; 8, multiplexer; 9, OR logic circuit; and SB, system bus.

The system bus buffer 6 is provided as a common interface between the CPU 1 and cache 2 and the system bus SB.

Signals transmitted and received between the CPU 1 and cache 2 and the system bus buffer 6 are roughly divided into control signals, address signals, and data signals.

Control signal SCa is used as a duplex common control signal between the CPU 1, the cache 2 and the system bus buffer 6. Control signal SCb1, which is used only where the CPU 1 is a bus master, is used as a duplex signal between the CPU 1 and the cache 2 and as a duplex signal between the CPU 1 and the system bus buffer 6. Control signal SCb14 being inputted to the CPU 1 is an OR signal outputted from the OR logic circuit 9 which receives both a ready signal SCb12 outputted from the cache 2 and a ready signal SCc12 outputted from the memory system 3 via the system bus buffer 6, being used to transmit the end of data transfer to the CPU 1.

The ready signal SCb12 is used as a cache hit signal when the cache 2 hits.

Control signal SCc15 is a bus access abnormal signal when a read-access is executed from the memory system 3, and is outputted in addition to the ready signal SCc12 to the CPU 1 or cache 2. This signal is used to inform that the read-access is inadequate, for example.

Signal SCe is an operation allowance signal outputted from the cache 2 to the memory system 3. Signal SCf is used to control the CPU 1 from the cache 2 to stop the CPU 1 from executing a new bus cycle so that the address signal or bus control signal cannot be started.

Address signal AD1 is transmitted from the CPU 1 to both the cache 2 and the system bus buffer 6. Address signal AD2, which is used only when the CPU 1 is a bus master, is transmitted from the CPU 1 to both the cache 2 and a multiplexer 8. Address signal CAD2, which is used only when the cache 2 is the bus master, is transmitted from the cache 2 to the multiplexer 8.

In response to a multiplexer control signal SC2 outputted from the cache 2, the multiplexer 8 selects either the address signal AD2 or CAD2 to output as an address signal AD3 to the system bus buffer 6.

A data signal SD is used as a duplex common signal between the CPU 1, the cache 2 and the system bus buffer 6. And φ designates a clock which is transmitted to both the CPU 1 and the cache 2.

Figure 5:
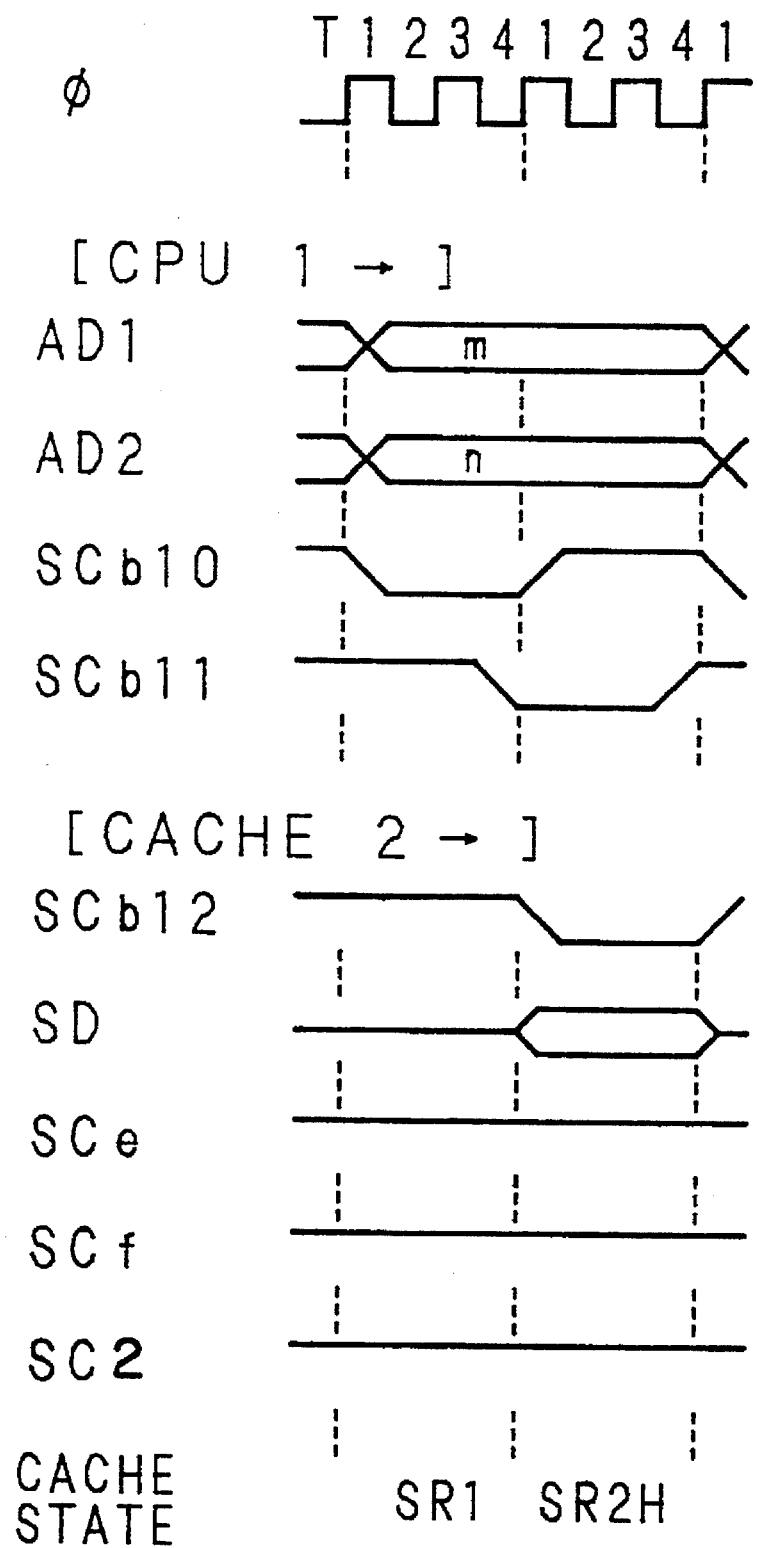
FIG. 5 is a timing chart illustrating the operation procedures of the data processor of FIG. 4 when the cache hits.
Figure 6:
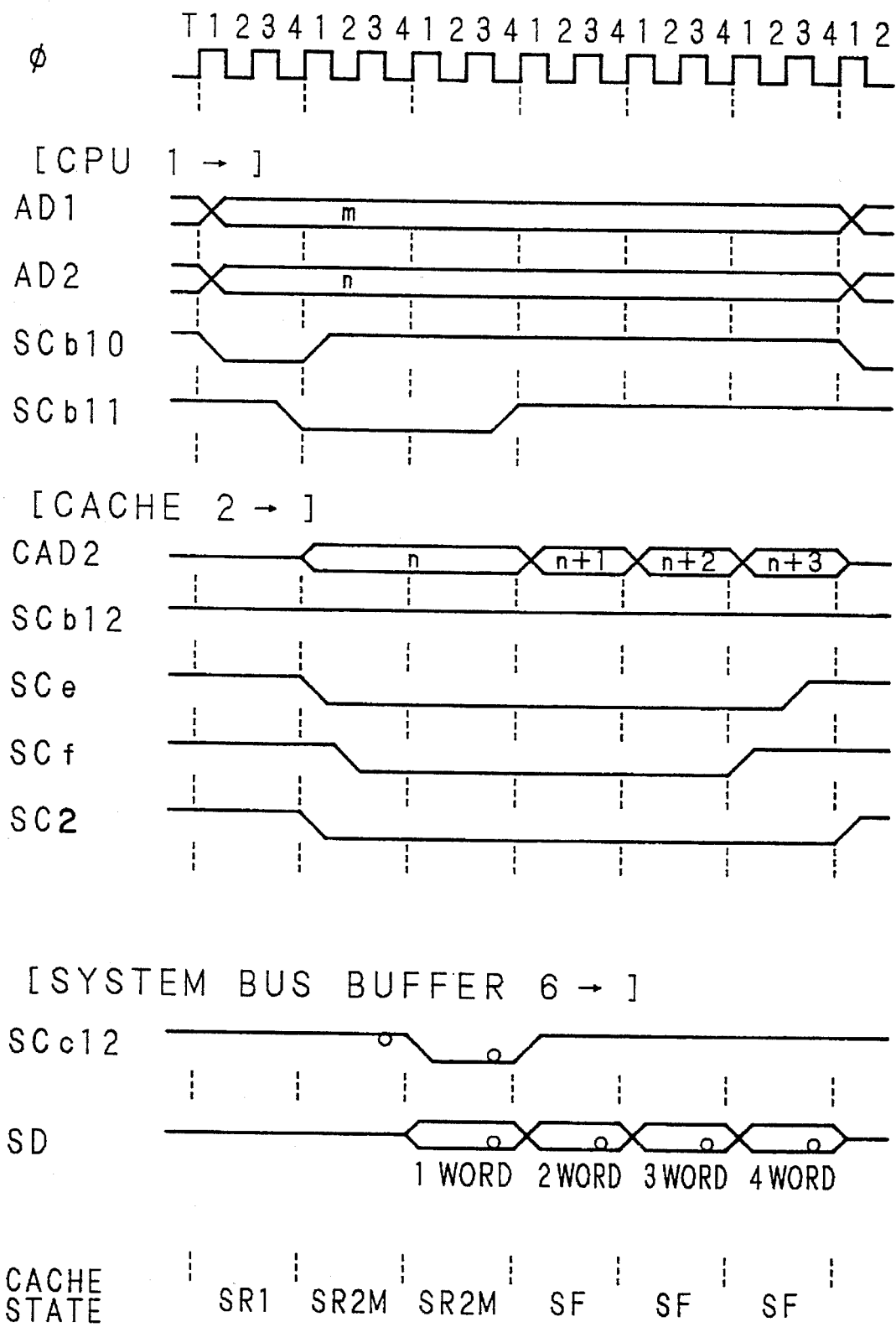
FIG. 6 is a timing chart illustrating the operation procedures of the data processor of FIG. 4 when the cache misses.

Next is a description of the cases where the cache 2 hits and misses when the CPU 1 uses the cache 2 in such a cache system of the present invention as constructed above with reference to timing charts of FIGS. 5 and 6. In the following description, assuming that the CPU 1 accesses to read data for the cache 2, the control signal SCa is then assumed to activate the cache 2.

In the CPU 1, one bus cycle consists of four timings T1 through T4 (designated by T1234 in FIG. 5) of the clock φ as shown in FIG. 5, and when the CPU 1 accesses to read a single data, this operation is completed in two bus cycles with no wait.

FIG. 5 is a timing chart illustrating the state of execution of a no wait operation where the cache 2 hits when the CPU 1 accesses to read the single data for the cache 2.

In FIG. 5, "CPU 1→" designates signals outputted from the CPU 1; the address signal AD1 (address value "m") designates the high order 28 bits of address, and the address signal AD2 (address value "n") designates the low order 2 bits of address.

Control signals SCb10 and SCb11 are both included in the control signal SCb1. Signal SCb10 is asserted over one bus cycle in order to inform that the CPU 1 starts a bus access for the external device. Signal SCb11 expects defined data and starts to be asserted after a rise of timing T4 (hereinafter referred to as T4↑) at which the control signal SCB10 is triggered.

"Cache 2→" designates signals outputted from the cache 2, and when the cache 2 hits, both the ready signal SCb12 showing that the cache 2 hits and the data signal SD are outputted. In this case, because the cache 2 is not the bus master, signal SC2 which controls the multiplexer 8 and control signal SCe which requests permit of operation for the memory system 3 are both negated.

Described below is the operation of the data processor of the present invention when the cache 2 hits when the CPU 1 accesses to read for the cache 2.

The bus cycle in which the signal SCb10 is asserted by the CPU 1 and outputs of the next address signals AD1, AD2 are started is called the state SR1 of cache 2. During state SR1 of cache 2, the cache 2 decides whether to hit. As a result of this decision, when the cache 2 hits, during the next bus cycle, called the state SR2H, both ready signal SCb12 showing that the cache 2 hits and data signal SD are asserted, and data is transferred to the CPU 1.

The following is a description of operation procedures of the data processor of the present invention in the case where data of 4 words is read from memory system 3, including a single data which is requested to read-access by the CPU 1 when the cache 2 misses.

When the cache 2 decides to miss, the data of 4 words including the single data which was accessed to read by the CPU 1 are read from the memory system 3 connected to the system bus SB by a round robin method.

This operation is shown in a timing chart of FIG. 6 showing the operation procedures in a case where the cache misses. Each of those control signals in FIG. 6 is low-active.

First, during the state SR1 in which the read-access is requested by the CPU 1, when the cache 2 decides to miss, the ready signal SCb12 showing the cache 2 hits is not asserted during the next bus cycle, called state SR2M, but the control signal SCe for the system bus buffer 6 is asserted, and the read operation is activated for the memory system 3.

The cache 2 asserts the multiplexer control signal SC2 for the multiplexer 8, and outputs the address signal CAD2 (address value "n" accessed by CPU 1) outputted from the multiplexer 8 as the address signal AD3 to the system bus buffer 6. For this address, ready signal SCc12 which was transferred from the memory system 3 is inputted to the cache 2, while it is inputted as ready signal SCb14 from the OR logic circuit 9 to the CPU 1.

At this time, in the present bus cycle called state SR2M, the control signal SCf which stops the CPU 1 from activating a new bus cycle is asserted.

When the ready signal SCc12 and data signal SD outputted from the system bus buffer 6 are both asserted, the CPU 1 and cache 2 are simultaneously sampled at the timing T3↓ to read data. The CPU 1 negates control signal SCb11, terminating the read-access of the single data.

At this point, the control signal SCf outputted from the cache 2 has already been asserted as described above, the next bus cycle is not newly asserted and both the address signals AD1 ("m"), AD2 ("n") are holding their previous values. During this time, the CPU 1 can continue execution of its internal processing, such as the pipeline processing.

After that, while the cache 2 sequentially increments the address signal CAD2 by the values "n+1", "n+2", "n+3", respectively, by one bus cycle using a round robin method, it also accesses the memory system 3 to read data of the second word, third word, and fourth word corresponding to each value.

While the cache 2 is outputting the value "n+3" as the address signal CAD2, it negates the control signal SCf so that the CPU 1 can execute a normal access from the next bus cycle.

As described above, in a data processor with the cache system of the present invention and according to its data access method, data of the address designated by the CPU is first simultaneously read in parallel in both the CPU and cache and after the CPU completes the read-access, the rest of data is read into the cache.

The CPU does not newly assert the address signal, the bus control signal, and the like, but continues to execute its internal processing, such as pipeline processing. Accordingly, when the CPU reads the single data, this operation is executed more promptly than when the conventional cache reads the rest of the data by the reread operation, and internal processing is carried out faster than by the conventional cache.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A data processor having a CPU, a memory which stores data to be accessed by said CPU, a cache which stores a portion of the data being stored in said memory, and a system bus buffer coupling said memory with said CPU and said cache, said data processor comprising:

detecting means for detecting unavailability in said cache of a desired subset of data located at a particular address when said desired subset of data is requested by said CPU;

first generating means for generating a first signal in response to said detecting means, said first signal being sent from said cache to said memory enabling said memory to output a block of data from said memory, and enabling said cache to receive said block of data, which contains said desired subset of data and a plurality of remaining subsets of data, said desired subset of data always being the first subset of data of said block of data to be output from said memory regardless of location in said block, as a result of a direct access to the desired subset of data in said memory, and said plurality of remaining subsets of data being output from said memory, following said desired subset of data, as a result of the direct access to the desired subset of data in said memory;

second generating means for generating a second signal, said second signal being sent from said cache to said CPU preventing said CPU from accessing data other than said desired subset of data while said first signal is activated, said CPU remaining operational to perform internal processing functions while said second signal is generated;

third generating means for generating a third signal, said third signal being sent from said CPU to said system bus buffer enabling said CPU to access said desired subset of data, said CPU and said cache accessing said desired subset of data simultaneously, said third signal being deactivated by said CPU after said desired subset of data is accessed by said CPU; and fourth generating means for generating a fourth signal, said fourth signal being sent from said cache to said memory and containing address information related to said plurality of remaining subsets of data within said memory.

2. A data processor of claim 1 wherein said block of data is output from said memory over a period of four contiguous bus cycles, a portion of said block of data being output during each bus cycle.

* * * * *